(12) United States Patent
Kothandaraman et al.

(10) Patent No.: US 9,830,173 B1
(45) Date of Patent: Nov. 28, 2017

(54) PROXY SIMULATION SERVICE FOR TESTING STATELESS SYSTEMS

(71) Applicant: Amazon Technologies, Inc., Seattle, WA (US)

(72) Inventors: Raghunathan Kothandaraman, Bangalore (IN); Praveen Dasigi, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 414 days.

(21) Appl. No.: 14/683,045

(22) Filed: Apr. 9, 2015

(51) Int. Cl.
    *G06F 9/45*     (2006.01)
    *G06F 9/455*     (2006.01)
    *G06Q 10/06*     (2012.01)
    *H04L 12/26*     (2006.01)

(52) U.S. Cl.
    CPC .......... *G06F 9/455* (2013.01); *G06Q 10/067* (2013.01); *H04L 43/00* (2013.01); *H04L 43/50* (2013.01)

(58) Field of Classification Search
    CPC ......... H04L 43/00; H04L 43/50; H04L 12/14; H04L 47/10; G06F 11/3466; G06F 17/2247; G01D 4/004; G06Q 30/0204; G06Q 10/087
    See application file for complete search history.

(56) References Cited

U.S. PATENT DOCUMENTS

| | | | | |
|---|---|---|---|---|
| 4,545,013 A * | 10/1985 | Lyon | ....................... | H04L 43/50 714/712 |
| 6,088,659 A * | 7/2000 | Kelley | ................... | G01D 4/004 340/870.02 |
| 9,015,336 B2 * | 4/2015 | Lassila | .................... | H04L 12/14 709/231 |
| 9,325,734 B1 * | 4/2016 | Peacock | ............. | G06F 17/2247 |
| 2007/0203810 A1 * | 8/2007 | Grichnik | .............. | G06Q 10/087 705/28 |
| 2007/0233896 A1 * | 10/2007 | Hilt | ......................... | H04L 47/10 709/238 |
| 2013/0332624 A1 * | 12/2013 | Chewter | ................. | H04L 43/00 709/238 |
| 2015/0081389 A1 * | 3/2015 | Dereszynski | ...... | G06Q 30/0204 705/7.33 |
| 2015/0212920 A1 * | 7/2015 | Kraus | ................. | G06F 11/3466 717/127 |

* cited by examiner

*Primary Examiner* — Kandasamy Thangavelu
(74) *Attorney, Agent, or Firm* — Knobbe Martens Olson & Bear LLP

(57) ABSTRACT

An enhanced proxy simulation service can be used to test a complex stateless system, such as a fulfillment network, that depends on upstream and downstream processes in order to operate. The enhanced proxy simulation service can be configured to send an event, such as an order request, so as to appear to be sent from a process upstream of the system; and can be configured to receive a request from the system, such as a request to charge payment information, so as to appear as a downstream process of the system. The proxy simulation service can store events received from the system and apply a set of rules to the stored events to construct a simulated response to the last event received from the system. The simulated response can then be sent to the system being tested.

20 Claims, 6 Drawing Sheets

PROXY SIMULATION SERVICE FOR TESTING STATELESS SYSTEMS

BACKGROUND

Complex systems frequently depend on multiple upstream and downstream processes. For example, an order fulfillment network (which may be a chain of both computing and non-computing processes that work together to fulfill a customer order) is a complex system that makes business-critical decisions based on information received from a sequence of upstream and downstream processes. An upstream process can include any process that can send a call or an event (including a request) to the system, whereas a downstream process can include any process to which the system can send a call or an event (including a request).

In particular, an example of an upstream process in an order fulfillment network includes a customer placing an order and providing payment information. The order fulfillment network may receive the order and submit a request to a downstream process, such as a payment gateway, to verify the customer's payment information and process a charge. In response to this request, the payment gateway may provide any of several responses. For example, the payment gateway may successfully authenticate the customer's payment information and process a charge. Alternatively, the payment gateway may not be able to process the customer's payment information and decline a charge. In each of these cases, the payment gateway may provide a response to the order fulfillment network indicating either a successful charge or a failure. In addition, it may be the case that no response is received from the payment gateway in a certain period of time, and the request times out. Furthermore, the order fulfillment network may include any additional number of upstream and downstream processes.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
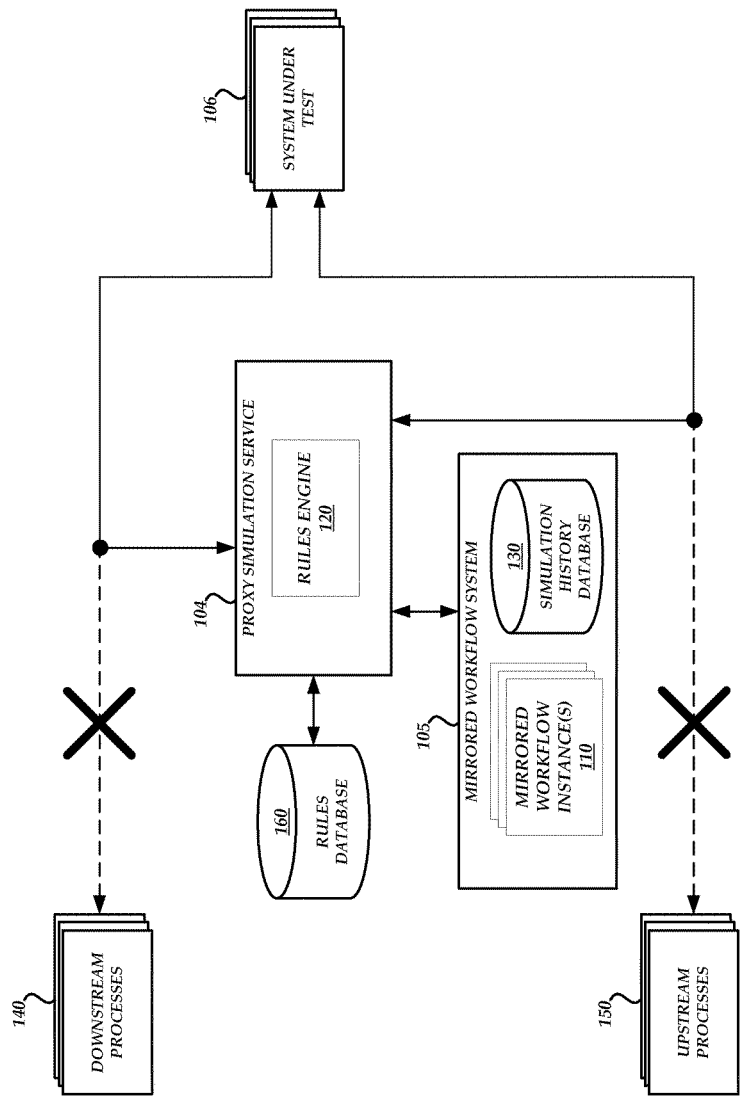
FIG. 1 illustrates an exemplary stateless system testing environment according to one embodiment.

Complex systems, such as an order fulfillment network, are expected to be robust enough to handle jumbled messages (e.g., out of order events) and dropped events, in addition to normal events. Business-critical processes, such as processing of a customer's payment information, may not proceed as intended if the business-critical processes are not robust. As one example, for the order fulfillment network described above, it is important that the order fulfillment network respond correctly depending on the response received from the payment gateway. If the payment gateway indicates that the customer's payment information was successfully charged, the order fulfillment network may proceed to the next step of fulfilling the customer's order. If the payment gateway indicates that the customer's payment information was declined, the order fulfillment network may need to request alternate payment information from the customer. In addition, if no response is received from the payment gateway after a certain period of time, the order fulfillment network may want to send a second payment request to the payment gateway.

Despite the importance of systems that depend on upstream and downstream processes, testing such systems is complex. Manually recreating all or even most possible scenarios that can occur in such a system is seldom feasible and tedious at best. For example, to test a series of steps or processes, it is frequently necessary to test a series of sub-steps, each of which may provide any of multiple responses, and which may depend on additional sub-steps. In addition, attempting to keep track of which step, or sub-step, or sub-sub-step, is being tested (which is typically done for systems that track their current configuration or state or that track a state of interaction with other computing devices or systems, sometimes referred to as stateful systems) could quickly overwhelm the memory resources of any test system, particularly for any appreciable number of test cases.

Testing such systems can also be complex if the systems are stateless. A system may be stateless if the system is unaware of and/or does not record one or more preceding events in a given sequence of interactions with downstream and/or upstream processes. By not recording one or more preceding events, a stateless system may not track a state of its interaction with downstream and/or upstream processes and therefore may be unaware of its current state or configuration. Stateless systems may generate a response to an event based solely on information provided with the event. Stateful systems, on the other hand, may generate a response to an event based on at least the systems' current state or configuration. A system may be stateless even if an upstream or downstream process maintains information regarding the state or configuration of the system.

Generally, a stateful system may send an event where a downstream process is the intended recipient. The testing framework may simulate the downstream process and query the stateful system or another external source to determine a state of the stateful system. The state information may be important because there may not be a one-to-one correlation between events and responses. For example, the state of the system may determine whether the downstream process responds to an event with a first response or a second response. However, many systems may be stateless because they rely on downstream processes to maintain any state or configuration information. If the system is stateless, then the testing framework used to test the system may not be able to query or otherwise obtain the state information. For example, the testing framework may not be able to query the downstream process for the state information because having the testing framework communicate with the downstream or upstream processes defeats the purpose of having a testing framework. The testing framework would no longer exist independent of the downstream or upstream processes that it is intended to simulate. A database associated with the downstream or upstream process would need to be running for the testing framework to obtain the state information, forcing a dependency. The testing framework may also have to forward the event to the downstream or upstream process. In addition, the testing framework may not be able to query the downstream process for the state information because such an approach may not scale. If, for example, the testing framework is intercepting requests to a large number of downstream processes (e.g., 40-50 downstream processes), then the testing framework may have to be specifically configured to communicate with each of the downstream processes (and be configured to determine how each individual downstream process stores the state information). Thus, the testing framework may not be able to properly simulate upstream or downstream processes during the testing of the stateless system.

Accordingly, aspects of the present disclosure are directed to providing a test framework for testing a stateless system (e.g., a fulfillment network) that sends information to, and receives information from, at least one upstream or previous process and at least one downstream or subsequent process. The stateless system under test may include one or more computer systems running various processes and services. In some embodiments, the stateless system under test includes, or receives information from/sends information to, other processes and services that are not executed by a computer. In some embodiments, a computing device running a proxy simulation service implements the test framework by simulating upstream and downstream processes. The proxy simulation service is described in greater detail U.S. patent application Ser. No. 14/133,088, titled "STATELESS SIMULATION SERVICE" and filed on Dec. 18, 2013, the contents of which is hereby incorporated by reference in its entirety. The computing device may be configured to send an event or a sequence of events to the stateless system for testing purposes. For example, the computing device can send an event, such as an order request, to the stateless system so as to appear to be sent from a process upstream of the stateless system. Likewise, the computing device can receive an event, such as a request to charge payment information that is based on the sent event, from the stateless system. In receiving the system request, the computing device may function as a process downstream of the stateless system. As used herein, an event may be any request to process information, perform an action, return a result, and/or any other form of request.

Because the stateless system is stateless, the computing device may not be able to retrieve state information associated with the stateless system from the stateless system or any other source external to the computing device. Thus, the present disclosure provides an enhanced proxy simulation service that may implement a mirrored workflow via a mirrored workflow system by which the state information can be derived from events transmitted by the stateless system. For example, each event transmitted by the stateless system and intended for an upstream or downstream process may be intercepted by the proxy simulation service. When an event is received, the proxy simulation service may store metadata associated with the event (e.g., the type of event, a time that the event was received, etc.) in a simulation history database (via, for example, the mirrored workflow system, which may store the simulation history database). As described herein, the computing device may run multiple simulation tests of the stateless system (or other stateless systems) in parallel. A separate mirrored workflow instance may run each simulation test, each simulation test may be associated with a unique identifier, and the unique identifier associated with the simulation test from which the event was received may also be stored in the simulation history database. The proxy simulation service may then retrieve metadata for some or all of the events stored in the simulation history database that are associated with the unique identifier (e.g., metadata for some or all of the events that originated during the same simulation test).

The proxy simulation service may further include a rules engine and be in communication with a rules database. The rules database may include a set of rules associated with each simulation test. The set of rules, when applied to metadata for an event or a sequence of events, may be used to deterministically generate a simulated response that can be transmitted to the stateless system. Thus, the proxy simulation service may use the rules engine to generate a simulated response to the received event. For example, the rules engine may load one or more rules associated with the running simulation test and apply the loaded rules to the retrieved metadata. Applying the loaded rules to the retrieved metadata may result in the generation of a simulated response. The proxy simulation service may then transmit the generated simulated response to the stateless system in response to receiving the event. Receiving events and providing simulated responses may allow the proxy simulation service to validate (or not validate) the operation of the stateless system.

In further embodiments, the implemented mirror workflow provides mechanisms to ensure that the proxy simulation service does not wait indefinitely for the stateless system to transmit a second event. For example, once the proxy simulation service receives an event, the proxy simulation service may notify the mirrored workflow system and the mirrored workflow system may start a timer that runs for a period of time. If another event is received from the stateless system during the period of time, then the proxy simulation service instructs the mirrored workflow system that an event has been received and/or to reset the timer. If the timer expires (e.g., no events were received from the stateless system during the period of time), then the mirrored workflow system may instruct the proxy simulation service to check to determine whether the stateless system is still running (or the mirrored workflow system itself may check to determine whether the stateless system is still running). If the stateless system is still running, then the proxy simulation service continues to wait for another event to be received. If the stateless system is no longer running, then the proxy simulation service (e.g., independently or based on an instruction received from the mirrored workflow system) or the mirrored workflow system itself may end the simulation. Ending the simulation may cause the proxy simulation service (or the mirrored workflow system) to close the mirrored workflow instance associated with the now completed simulation test and transfer the closed mirrored workflow instance to offline data storage (e.g., after a period of time, such as one year). Thus, in instances in which the mirrored workflow system independently determines whether the stateless system is still running and closes a mirrored workflow instance if the stateless system is no longer running, the mirrored workflow instance may complete a lifecycle (e.g., from being instantiated when a simulation test begins to being closed when the simulation ends) without being managed by the proxy simulation service.

In some embodiments, the proxy simulation service functions both as a test bed that can push a sequence of events to a stateless system and also as a single entity that simulates downstream processes upon which the stateless system is dependent. As such, the proxy simulation service is self-contained, and no other processes need to be simulated for testing. In yet other embodiments, the proxy simulation service can wrap the sequence of events to be pushed and the simulated responses from downstream processes in a single simulation test case. In addition, the stateless system can be progressively tested by adding more of these simulation test cases to the proxy simulation service.

A proxy simulation service that implements a mirrored workflow via the mirrored workflow system may provide several technical benefits. For example, the mirrored workflow may allow the proxy simulation service to be self-managed such that the proxy simulation service can detect when the stateless system has finished executing and automatically close the mirrored workflow instance associated with the simulation test of the stateless system. Thus, as described herein, the mirrored workflow may prevent the proxy simulation service from hanging while waiting for an event from a stateless system that has already finished executing.

As another example, the mirrored workflow may allow the proxy simulation service to test and validate a wide variety of different types of stateless systems. The mirrored workflow may operate using a generic state diagram such that the proxy simulation service can receive and process any type of event without having to modify its operation. An administrator merely has to load an appropriate set of rules that can be applied to one or more events for the proxy simulation service to properly test a stateless system. Thus, the proxy simulation service may be scalable such that any type of stateless system can be tested. Furthermore, this may reduce the costs associated with implementing the proxy simulation service as additional processors, memory, and/or other hardware resources that otherwise could be used to scale the functionality of the proxy simulation service (e.g., so that the proxy simulation service could handle new types of events) may not be necessary.

Stateless System Testing Environment

FIG. 1 illustrates an exemplary stateless system testing environment according to one embodiment. As illustrated in FIG. 1, the environment includes a proxy simulation service 104, a mirrored workflow system 105, a system under test 106, one or more downstream processes 140, one or more upstream processes 150, and a rules database 160.

In an embodiment, the system under test 106 includes one or more computer systems running various processes and services. For example, the system under test 106 may be a subsystem of an order fulfillment system, a payment system, a returns processing system, and/or any other system in which different responses may be provided to the same event call (e.g., depending on the state of the system under test 106). In some embodiments, the system under test 106 includes, or receives information from/sends information to, other processes and services that are not executed by a computer. The system under test 106 may be stateless such that the system under test 106 does not maintain a record of its current state (e.g., a record of a number of times an event has been transmitted and intended for a downstream process 140).

During normal run-time, the system under test 106 may be coupled to one or more downstream processes 140 and/or one or more upstream processes 150. The downstream processes 140 and/or the upstream processes 150 may be computing systems that are configured to process requests and provide responses. The downstream processes 140 may depend on data received from the system under test 106 and the system under test 106 may depend on data received from the upstream processes 150. Thus, the downstream processes 140 and/or the upstream processes 150 may also be various computing systems that are subsystems of an order fulfillment system, a payment system, a returns processing system, and/or any other system in which different responses may be provided to the same event call.

The proxy simulation service 104 may provide a test framework for testing the system under test 106. During testing, the system under test 106 may be decoupled from the downstream processes 140 and the upstream processes 150 such that all transmissions from the system under test 106 and intended for the downstream processes 140 or the upstream processes 150 are instead routed to the proxy simulation service 104. Likewise, all transmissions that may normally originate from the downstream processes 140 and the upstream processes 150 may instead originate from the proxy simulation service 104.

In an embodiment, the proxy simulation service 104 can run multiple simulation tests of the system under test 106 and/or other systems under test in parallel and/or in an overlapping manner. For example, the proxy simulation service 104 can separately test multiple aspects of the system under test 106 at the same time or at different times. Thus, in some instances, the proxy simulation service 104 may receive, in succession, a first event from the system under test 106 that was transmitted as a part of a first simulation test, a second event from the system under test 106 that was transmitted as a part of a second simulation test, and a third event from the system under test 106 that was transmitted as a part of the first simulation test. The proxy simulation service 104 may assign each simulation test a unique identifier.

The proxy simulation service 104 may be in communication with the mirrored workflow system 105 to provide the test framework described herein. For example, the mirrored workflow system 105 may include one or more mirrored workflow instances 110. A separate mirrored workflow instance 110 may be assigned to each simulation test and may be active while the simulation test is running. When the proxy simulation service 104 receives an event from the system under test 106, the proxy simulation service 104 may transmit such information to the mirrored workflow system 105. The mirrored workflow instance 110 assigned to the simulation test under which the system under test 106 transmitted the event may be configured to store metadata associated with the event (e.g., the type of event, a time that the event was received, etc.) and the unique identifier associated with the simulation test in a simulation history database 130. Thus, because the system under test 106 may be stateless, the proxy simulation service 104 (via the mirrored workflow instance 110 in the mirrored workflow system 105) may attempt to derive the state information by storing the above-described data in the simulation history database 130. The contents of the simulation history database 130 are described in greater detail below with respect to FIG. 3.

The mirrored workflow instance 110 may be further configured to start a timer that expires after a period of time (e.g., five minutes) once the event is received. If another event is received from the system under test 106 before the timer expires (and the event was transmitted by the system under test 106 as a part of the simulation test associated with the mirrored workflow instance 110), then the timer may be reset. However, if no event is received from the system under test 106, then the mirrored workflow instance 110 may check to determine whether the system under test 106 is still running (e.g., independently or by sending a request to the proxy simulation service 104 to check to determine whether the system under test 106 is still running). If the system under test 106 is still running, then the mirrored workflow instance 110 may continue to wait to receive another event. In some embodiments, the mirrored workflow instance 110 starts a second timer or restarts the existing timer once a determination is made that the system under test 106 is still running. The mirrored workflow instance 110 may then check again to determine whether the system under test 106 is still running once the second timer or the existing timer expires. If the system under test 106 is no longer running, then the mirrored workflow instance 110 may transition itself into an inactive or closed state. Such a transition may cause the proxy simulation service 104 to decouple from the system under test 106 (e.g., once the proxy simulation service 104 is notified that the mirrored workflow instance 110 has transitioned itself into an inactive or closed state, once the proxy simulation service 104 receives an instruction from the mirrored workflow instance 110 to stop the simulation test, etc.) such that the system under test 106 once again communicates with the one or more downstream processes 140 and/or the one or more upstream processes 150. Thus, the mirrored workflow instance 110 may automatically close if the system under test 106 has finished executing. The closed mirrored workflow instance 110 may be transferred to offline data storage (not shown) after a period of time (e.g., one year).

The proxy simulation service 104 may further include various modules, components, data stores, and the like to provide the test framework described herein. For example, the proxy simulation service 104 may include a rules engine 120. The rules engine 120 may apply a set of one or more rules to the metadata of one or more events received from the system under test 106. The rules engine 120 may be configured to support any complex composition of rules involving multiple condition checks on an event or event sequence. For example, a set of rules may indicate that a simulated response is based on a number of events associated with the same simulation test that have been received from the system under test 106, an order of events associated with the same simulation test that have been received from the system under test 106, a timestamp of an event received from the system under test 106, and/or the like. The rules engine 120 may load the set of rules from the rules database 160. The rules engine 120 may load a set of rules that are specific to each simulation test run by the proxy simulation service 104. Thus, the rules database 160 may store multiple sets of rules, where each set of rules is associated with a unique identifier (e.g., with a different simulation test). For an order fulfillment system, an example rule may include language that means "respond with an 'order canceled' order condition if a request to cancel an order is called once or respond with an 'order processing' order condition if the request to cancel an order is not called once."

For example, once the mirrored workflow instance 110 has stored the metadata associated with an event and the unique identifier in the simulation history database 130, the rules engine 120 may retrieve some or all of the metadata stored in the simulation history database 130 that is associated with the unique identifier. Thus, the rules engine 120 may retrieve metadata related to some or all of the events previously transmitted by the system under test 106 during a particular simulation test. The rules engine 120 may then retrieve the set of rules from the rules database 160 that is associated with the unique identifier, and apply the set of rules to the retrieved metadata. Alternatively, the rules engine 120 may retrieve the set of rules before retrieving the metadata. Applying the set of rules to the retrieved metadata may result in the rules engine 120 deterministically constructing a simulated response to the last event received by the proxy simulation service 104. The proxy simulation service 104 may transmit the simulated response to the system under test 106 as a response to the last event that was received from the system under test 106. This process of receiving events and providing simulated responses may allow the proxy simulation service 104 to validate (or not validate) the operation of the system under test 106.

As illustrated in FIG. 1, the proxy simulation service 104 and the mirrored workflow system 105 are located external to the system under test 106. The proxy simulation service 104 may be in communication with the system under test 106 via a network. The network may be a publicly accessible network of linked networks, possibly operated by various distinct parties, such as the Internet. In other embodiments, the network may include a private network, personal area network, local area network, wide area network, cable network, satellite network, cellular telephone network, etc. or combination thereof, each with access to and/or from the Internet. However, in other embodiments (not shown), the proxy simulation service 104 and/or the mirrored workflow system 105 or a portion of the proxy simulation service 104 and/or the mirrored workflow system 105 may be located within the system under test 106.

In some embodiments, the mirrored workflow system 105 is located external to the proxy simulation service 104. For example, the mirrored workflow system 105 may be stored and managed by a separate system or server and may be in communication with the proxy simulation service 104 via a direct connection or an indirect connection (e.g., via a network). In other embodiments, not shown, the mirrored workflow system 105 is located within the proxy simulation service 104.

In some embodiments, the simulation history database 130 is located external to the proxy simulation service 104 and internal to the mirrored workflow system 105. For example, the simulation history database 130 may be stored and managed by a separate system or server (e.g., the mirrored workflow system 105) and may be in communication with the proxy simulation service 104 via a direct connection or an indirect connection (e.g., via a network). In other embodiments, not shown, the simulation history database 130 is located within the proxy simulation service 104 or external to the mirrored workflow system 105 and the proxy simulation service 104.

The rules database 160 may also be located external to the proxy simulation service 104. For example, the rules database 160 may be stored and managed by a separate system or server (e.g., the mirrored workflow system 105) and may be in communication with the proxy simulation service 104 via a direct connection or an indirect connection (e.g., via a network). In other embodiments, not shown, the rules database 160 is located within the proxy simulation service 104.

In some embodiments, the mirrored workflow system 105 is partitioned such that each partition handles a class or sub-class of stateless systems under test 106. Each partition may include one or more mirrored workflow instances, a rules engine 120, a simulation history database 130, and/or a rules database 160. Thus, the proxy simulation service 104 may function as a conduit to select the appropriate mirrored workflow system 105 partition based on events received from the systems under test 106 and transmit simulated responses received from a mirrored workflow system 105 partition to the appropriate system under test 106.

Mirrored Workflow State Diagram

Figure 2:
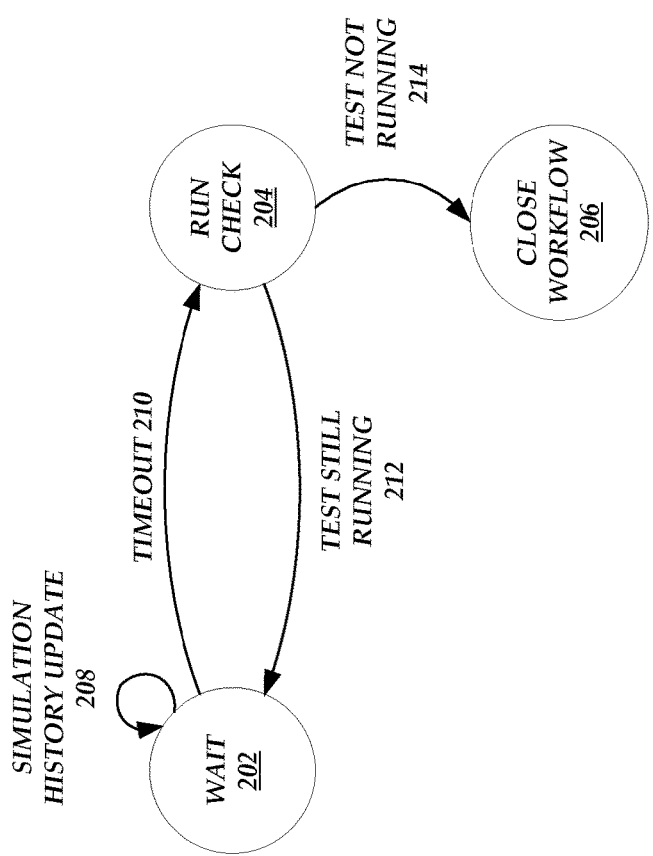
FIG. 2 illustrates an exemplary state diagram of a mirrored workflow instance, such as one of the mirrored workflow instances of FIG. 1.

FIG. 2 illustrates an exemplary state diagram of a mirrored workflow instance, such as one of the mirrored workflow instances 110 of FIG. 1. As illustrated in FIG. 2, a mirrored workflow instance 110 includes three state nodes: a wait state 202, a run check state 204, and a close workflow state 206. The mirrored workflow instance 110 may begin operating in the wait state 202. During the wait state 202, the mirrored workflow instance 110 may wait for an event to be received from the system under test 106. When an event is received, the mirrored workflow instance 110 may take the simulation history update edge 208 self-loop (e.g., remain in the wait state 202) by storing the metadata of the event and the unique identifier associated with the simulation test under which the system under test 106 transmitted the event in the simulation history database 130. Because the simulation history update edge 208 self-loop is generic and not specific to any type of event, the mirrored workflow instance 110 may not need any additional state nodes and is scalable such that it can be used to test any type of stateless system.

Taking the simulation history update edge 208 self-loop, may also cause the mirrored workflow instance 110 to start (or restart if the timer is already running) a timer that expires after a period of time. If the timer expires, the mirrored workflow instance 110 takes timeout edge 210 and transitions to the run check state 204. At the run check state 204, the mirrored workflow instance 110 determines whether the system under test 106 is still running. If the system under test 106 is still running, the mirrored workflow instance 110 takes test still running edge 212 and transitions back to the wait state 202. If the system under test 106 is no longer running, the mirrored workflow instance 110 takes test not running edge 214 and transitions to the close workflow state 206, where the mirrored workflow instance 110 closes itself and is no longer active.

Simulation History Database

Figure 3:
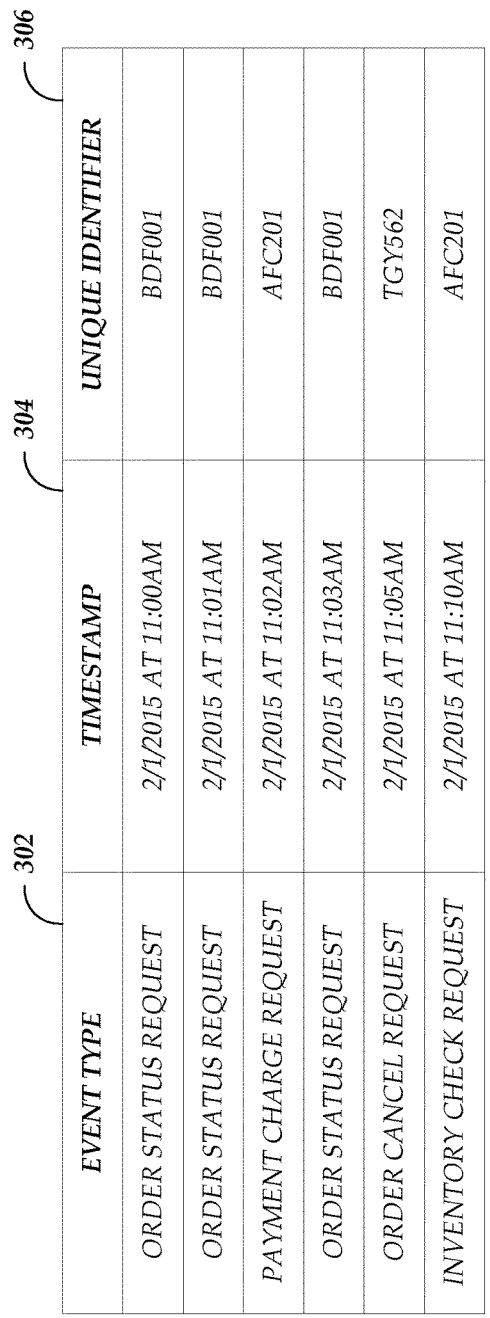
FIG. 3 illustrates the contents of an exemplary simulation history database, such as the simulation history database of FIG. 1.

FIG. 3 illustrates the contents of an exemplary simulation history database, such as the simulation history database 130 of FIG. 1. As illustrated in FIG. 3, the simulation history database 130 includes an event type field 302, a timestamp field 304, and a unique identifier field 306. The simulation history database 130 may store data in chronological order. Alternatively, the simulation history database 130 may organize the data such that data associated with the same unique identifier are stored adjacent to each other.

The event type field 302 may include information on a type of event received by the proxy simulation service 104. For example, such types may include an order status request, a payment charge request, an order cancel request, and inventory check request, and/or the like. The timestamp field 304 may indicate a time and/or date at which the event was received by the proxy simulation service 104. Alternatively, the timestamp field 304 may indicate a time and/or date at which the event was transmitted by the proxy simulation service 104 or the timestamp field 304 may indicate a time and/or date at which a simulation test started and a time and/or date at which a simulation test ended. The unique identifier field 306 may identify the unique identifier associated with a received event. The unique identifier may be an alphanumeric value, a key, a certificate, and/or any other type of digital identifier. The timestamp (e.g., time and/or date) included in the timestamp field 304 may be further used to order the type of events associated with the same unique identifier (e.g., in chronological or reverse chronological order).

Example Process for Testing a Stateless System

Figure 4:
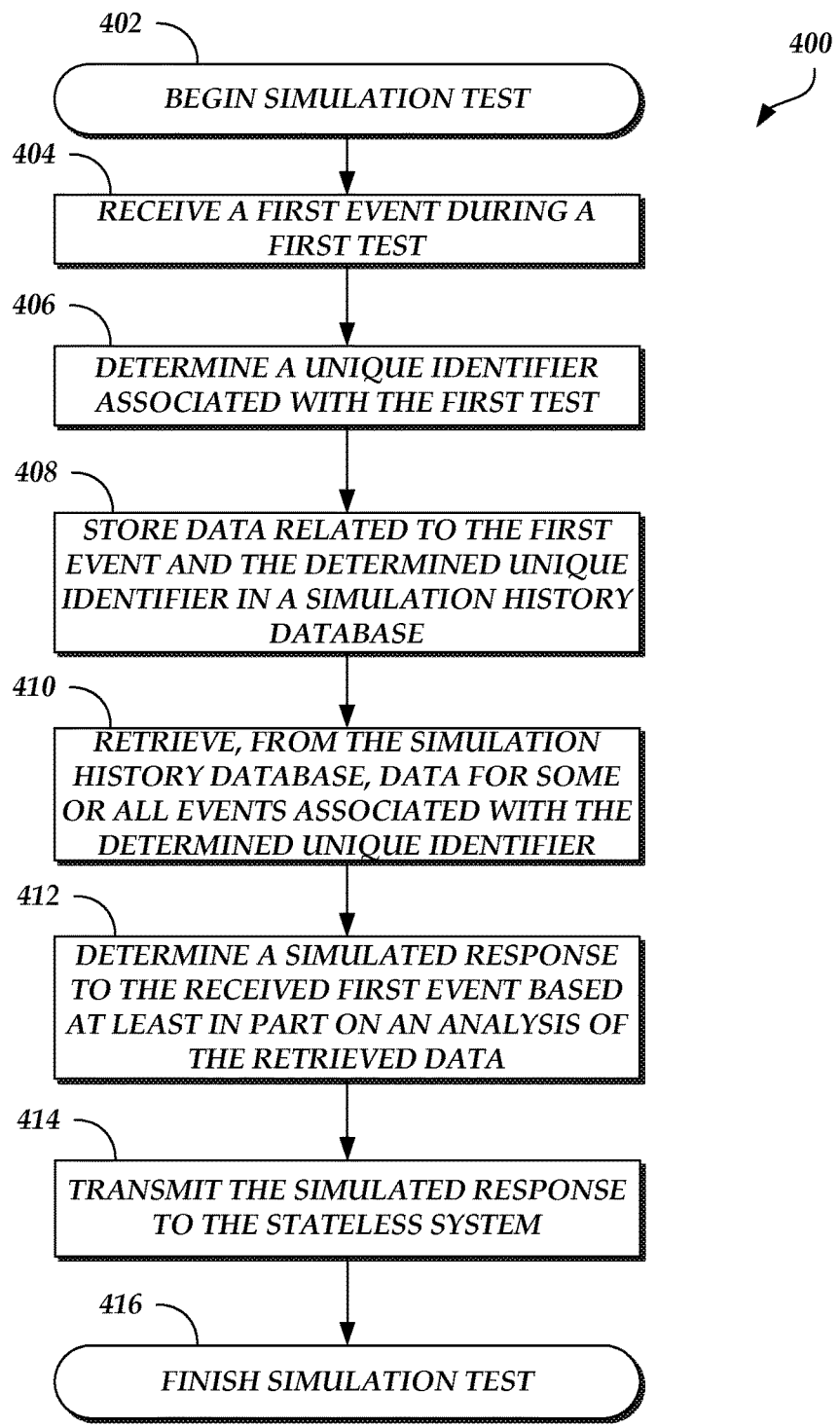
FIG. 4 illustrates a process that may be used by the proxy simulation service to simulate downstream and/or upstream processes to test a stateless system, such as the system under test of FIG. 1.

FIG. 4 illustrates a process 400 that may be used by the proxy simulation service 104 to simulate downstream and/or upstream processes to test a stateless system, such as the system under test 106 of FIG. 1. As an example, the proxy simulation service 104 and/or the mirrored workflow system 105 of FIG. 1 can be configured to implement the stateless system testing process 400. The stateless system testing process 400 begins at block 402.

At block 404, a first event during a first test is received. The first event may be received from the stateless system (e.g., the system under test 106). The first event may include metadata, such as information regarding the type of event and/or a timestamp.

At block 406, a unique identifier associated with the first test is determined. As described herein, the proxy simulation service 104 may assign each simulation test a unique identifier. An identification of a simulation test and its associated unique identifier may be stored internally by the proxy simulation service 104 (not shown). The proxy simulation service 104 may query this internal database to determine the unique identifier associated with the first test.

At block 408, the data related to the first event and the determined unique identifier are stored in a simulation history database. For example, the data related to the first event may be the first event's metadata. The metadata and the unique identifier may be stored in the simulation history database 130.

At block 410, data for some or all of the events associated with the determined unique identifier are retrieved from the simulation history database. For example, the data may be retrieved by the rules engine 120 of the proxy simulation service 104.

At block 412, a simulated response to the received first event is determined based at least in part on an analysis of the retrieved data. The simulated response may be constructed deterministically by the rules engine 120 based on a loaded set of rules that are associated with the unique identifier.

At block 414, the simulated response is transmitted to the stateless system. The simulated response may be transmitted to the stateless system as if originating from one of the downstream processes 140 or one of the upstream processes 150. The simulated response may be transmitted to the stateless system in response to the transmission by the stateless system of the first event. After the simulated response is transmitted to the stateless system, the stateless system testing process 400 may be complete, as shown in block 416.

Example Use Case: Fulfillment Network Environment

Figure 5:
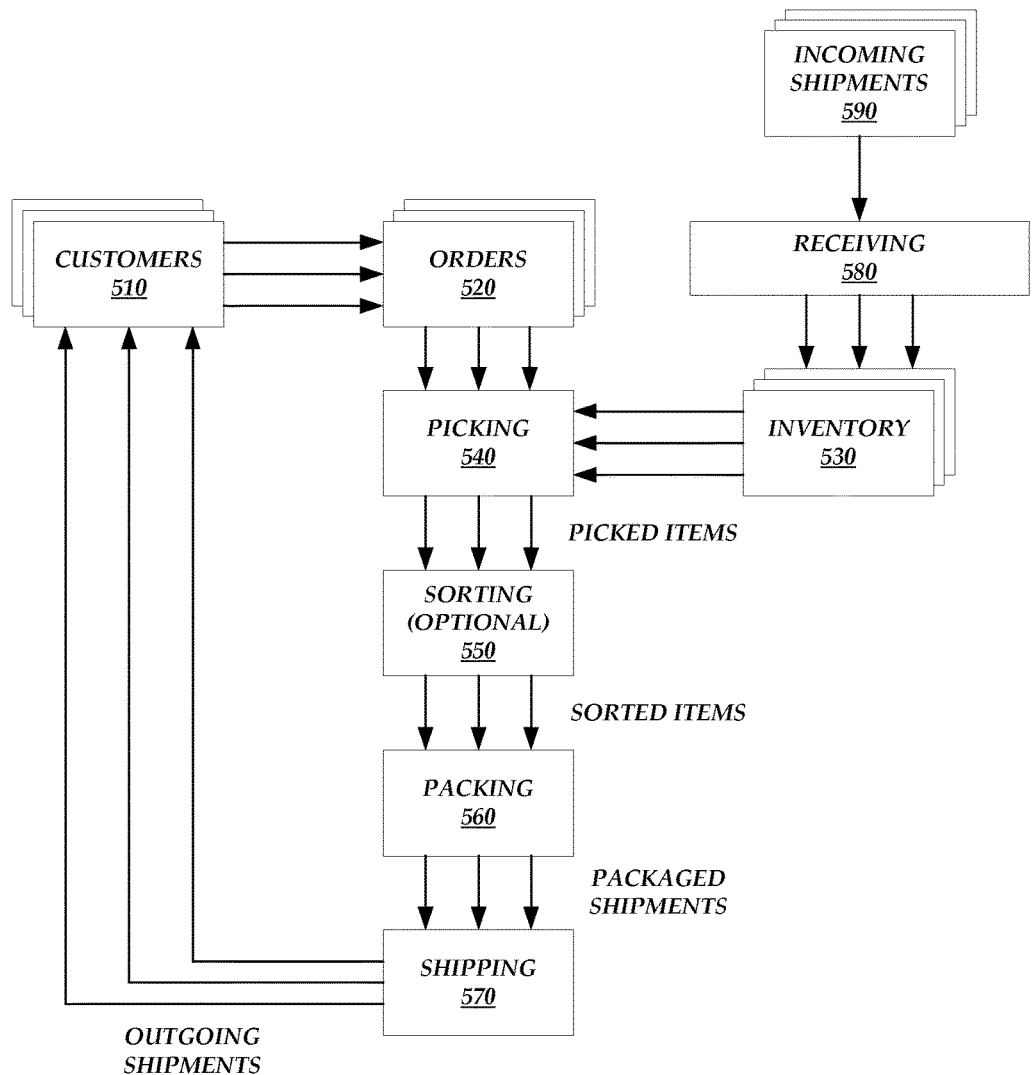
FIG. 5 is a block diagram of an order fulfillment network that may be tested utilizing a proxy simulation service according to an embodiment.

An order fulfillment network is an example of a complex system that depends on multiple upstream and downstream processes. FIG. 5 illustrates an example of a fulfillment network. The fulfillment network may include computing processes, such as processing orders 520, as well as non-computing processes, such as shipping orders 570. As an example, processing orders 520 may be a stateless system that can be tested using the proxy simulation service 104 and/or mirrored workflow system 105. Upstream processes include multiple customers 510 submitting orders 520 to the product distributor, where each order 520 specifies one or more items from inventory 530 to be shipped to the customer that submitted the order. To fulfill the customer orders 520, the fulfillment network submits a downstream request to a payment gateway so that payment information provided by the customer is verified and charged. If successfully charged, the fulfillment network proceeds to further downstream processes. For example, one or more items specified in each order may be retrieved, or picked, from inventory 530 in a materials handling facility of the fulfillment network, as indicated at picking 540. Picked items may be delivered or conveyed, if necessary, to one or more stations in the materials handling facility for sorting 550 into their respective orders, packing 560, and finally shipping 570 to the customers 510.

A fulfillment network may also include a receiving 580 operation or area for receiving incoming shipments 590 of stock from one or more sources (e.g., vendors) and for placing the received stock into stock storage. Receiving 580 may also receive and process returns of purchased or rented items or orders from customers. At least some of these items are typically returned to inventory 530.

The fulfillment network may not always respond as desired to every possible sequence of events from each upstream and downstream process. Accordingly, the proxy simulation service 104 and/or mirrored workflow system 105 can be used to simulate the upstream and downstream processes in order to test the fulfillment network.

Illustrative System

Figure 6:
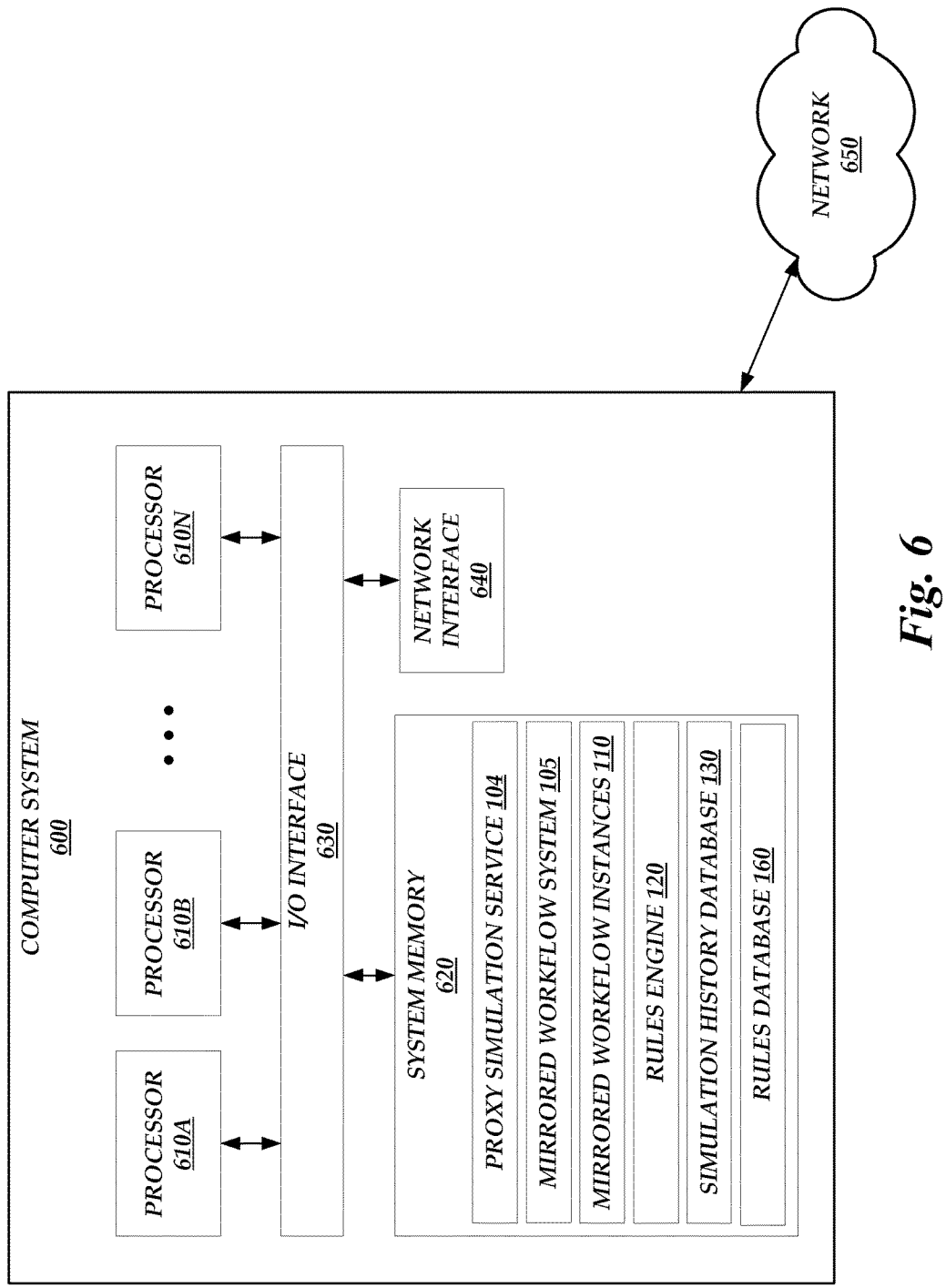
FIG. 6 is a block diagram depicting an illustrative embodiment of a computer system configured to function as a proxy simulation service according to an embodiment.

In one embodiment, a system that implements one or more components of the proxy simulation service 104 and/or mirrored workflow system 105 as described herein may include a computer system that includes or is configured to access one or more computer-accessible media, such as computer system 600 illustrated in FIG. 6. In the illustrated embodiment, computer system 600 includes one or more hardware processors 610 coupled to a system memory 620 via an input/output (I/O) interface 630. Computer system 600 further includes a network interface 640 coupled to I/O interface 630.

In various embodiments, computer system 600 may be a uniprocessor system including one processor 610, or a multiprocessor system including several processors 610A, 610B, . . . , 610N (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a proxy simulation service 104, a mirrored workflow system 105, mirrored workflow instances 110, a rules engine 120, a simulation history database 130, and/or a rules database 160, are shown stored within system memory 620.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 650, such as other computer systems or communications devices. The communications channels may include, but are not limited to conventional and mobile telephone and text messaging communications channels. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a non-transitory computer-readable storage medium configured to store program instructions and data as described above for FIGS. 1 through 4 for implementing a proxy simulation service 104 and/or a mirrored workflow system 105. However, in other embodiments, program instructions and/or data may be received, sent or stored upon different types of computer-readable media. Generally speaking, a computer-accessible medium may include storage media or memory media such as magnetic or optical media, e.g., disk or DVD/CD coupled to computer system 600 via I/O interface 630. A computer-readable medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
 a simulation history database configured to store data regarding a plurality of events; and a computing device in communication with the simulation history database, the computing device configured to at least:
  receive, from a computing system, a first event during a first test, wherein the computing system does not store information regarding a state of the computing system, wherein the computing system is configured to send events to a downstream process, and wherein the computing device is configured to receive the first event as a proxy of the downstream process;
  determine a unique identifier associated with the first test;
  store data associated with the first event and the determined unique identifier in the simulation history database;
  retrieve, from the simulation history database, all events data associated with the determined unique identifier;
  determine a simulated response to the received first event based at least in part on an analysis of the retrieved events data; and
  transmit the simulated response to the computing system.

2. The system of claim 1, wherein the computing device is further configured to determine the simulated response based on at least one rule associated with the first test that is applied to the retrieved events data.

3. The system of claim 2, wherein the at least one rule associated with the first test indicates that the simulated response is based on at least one of a number of events associated with the events data retrieved from the simulation history database that are related to the first event, an order of events associated with the events data retrieved from the simulation history database that are associated with the first test, or a timestamp associated with the first event.

4. The system of claim 1, wherein the information regarding the state of the computing system comprises an identification of one or more events transmitted by the computing system.

5. The system of claim 1, wherein the computing device is further configured to at least:
  start, after receiving the first event, a timer that expires after a first period of time;
  determine, in response to a determination that no events are received from the computing system during the first period of time, whether the computing system is running;
  end the first test in response to a determination that the computing system is not running; and
  continue to wait to receive a second event from the computing system for a second period of time in response to a determination that the computing system is running.

6. The system of claim 1, wherein the computing device is further configured to at least receive, from the computing system, a second event during the first test, wherein the computing system is configured to send events to an upstream process, and wherein the computing device receives the second event as a proxy of the upstream process.

7. The system of claim 1, wherein the computing device is further configured to at least:
  receive, from the computing system, a second event during a second test running in parallel with the first test, wherein the computing device is configured to receive the second event as the proxy of the downstream process;
  determine a second unique identifier associated with the second test;
  store the second event and the determined second unique identifier in the simulation history database;
  retrieve, from the simulation history database, all events data associated with the determined second unique identifier;
  determine a second simulated response to the received second event based at least in part on an analysis of the retrieved events data associated with the determined second unique identifier; and
  transmit the second simulated response to the computing system.

8. The system of claim 1, wherein the simulated response comprises a plurality of commands.

9. A computer-implemented method comprising:
  as implemented by one or more computing devices configured with executable instructions,
  receiving, from a computing system, a first event during a first test, wherein the computing system does not store information regarding a state of the computing system, wherein the computing system is configured to send events to a first process, and wherein the one or more computing devices are configured to receive the first event as a proxy of the first process;
  storing data associated with the first event and a unique identifier associated with the first test in a simulation history database;
  retrieving, from the simulation history database, all events data associated with the unique identifier;
  determining a simulated response to the received first event based at least in part on an analysis of the retrieved events data; and
  transmitting the simulated response to the computing system.

10. The computer-implemented method of claim 9, wherein the first process is one of a downstream process that depends on data from the computing system or an upstream process that provides data from which the computing system depends.

11. The computer-implemented method of claim 9, wherein determining the simulated response further comprises determining the simulated response based on at least one rule associated with the first test that is applied to the retrieved events data.

12. The computer-implemented method of claim 11, wherein the at least one rule associated with the first test indicates that the simulated response is based on at least one of a number of events associated with the events data retrieved from the simulation history database that are related to the first event, an order of events associated with the events data retrieved from the simulation history database that are associated with the first test, or a timestamp associated with the first event.

13. The computer-implemented method of claim 9, wherein the information regarding the state of the computing system comprises an identification of one or more events transmitted by the computing system.

14. The computer-implemented method of claim 9, further comprising:
  starting, after receiving the first event, a timer that expires after a first period of time;
  determining, in response to a determination that no events are received from the computing system during the first period of time, whether the computing system is running;

ending the first test in response to a determination that the computing system is not running; and continue waiting to receive a second event from the computing system for a second period of time in response to a determination that the computing system is running.

15. The computer-implemented method of claim 9, further comprising:

receiving, from the computing system, a second event during a second test running in parallel with the first test, wherein the one or more computing devices are configured to receive the second event as the proxy of the first process;

storing the second event and a second unique identifier associated with the second test in the simulation history database;

retrieving, from the simulation history database, all events data associated with the second unique identifier;

determining a second simulated response to the received second event based at least in part on an analysis of the retrieved events data associated with the second unique identifier; and transmitting the second simulated response to the computing system.

16. A non-transitory computer-readable medium having stored thereon executable program code that direct a computing device to perform operations when executed by a simulation service operating on the computing device, the operations comprising:

receiving, from a computing system, a first event during a first test, wherein the computing system does not store information regarding a state of the computing system, wherein the computing system is configured to send events to a first process, and wherein the computing device is configured to receive the first event as a proxy of the first process;

storing data associated with the first event and a unique identifier associated with the first test in a database;

retrieving, from the database, data for at least one event associated with the unique identifier;

determining a simulated response to the received first event based at least in part on an analysis of the retrieved data for the at least one event; and transmitting the simulated response to the computing system.

17. The non-transitory computer-readable medium of claim 16, wherein the first process is one of a downstream process that depends on data from the computing system or an upstream process that provides data from which the computing system depends.

18. The non-transitory computer-readable medium of claim 16, wherein the operations further comprise determining the simulated response based on at least one rule associated with the first test that is applied to the retrieved data for the at least one event.

19. The non-transitory computer-readable medium of claim 16, wherein the information regarding the state of the computing system comprises an identification of one or more events transmitted by the computing system.

20. The non-transitory computer-readable medium of claim 16, wherein the operations further comprise:

starting, after receiving the first event, a timer that expires after a first period of time;

determining, in response to a determination that no events are received from the computing system during the first period of time, whether the computing system is running;

ending the first test in response to a determination that the computing system is not running; and continue waiting to receive a second event from the computing system for a second period of time in response to a determination that the computing system is running.

\* \* \* \* \*